Figure 1:
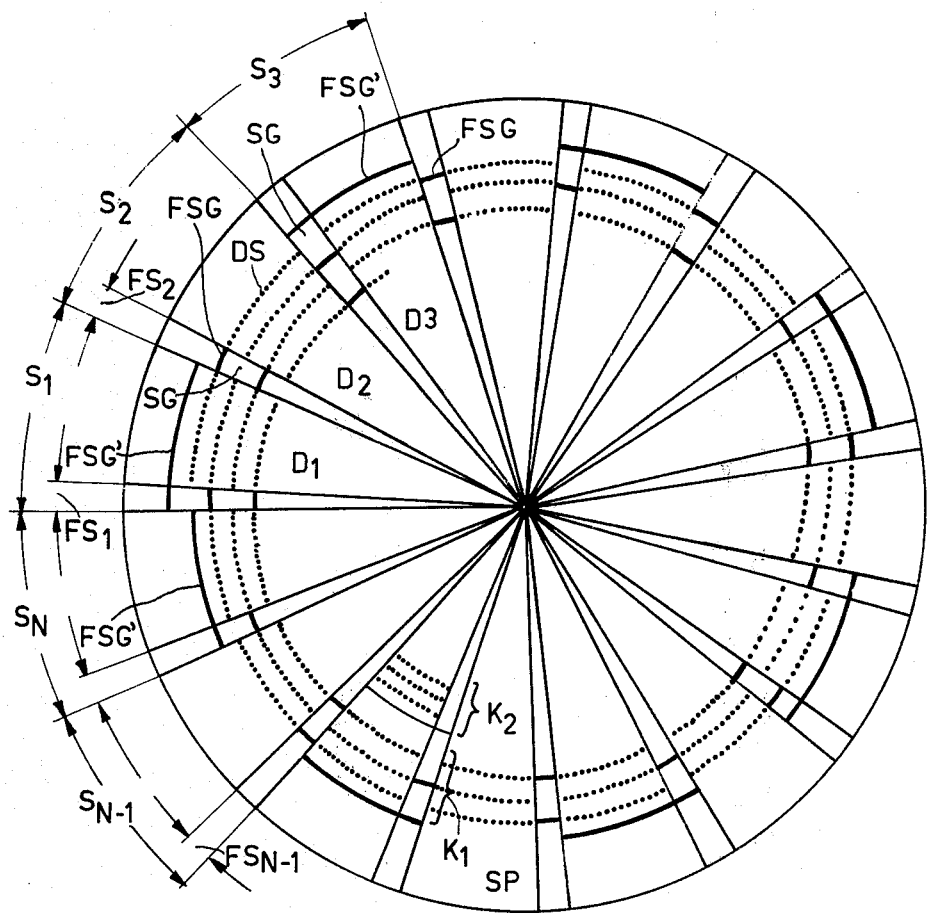

United States Patent [19]

Hill et al.

[11] 4,123,147
[45] Oct. 31, 1978

[54] ELECTRICALLY CONTROLLED ADJUSTING DEVICE FOR A LIGHT BEAM WITH DIGITAL AND ANALOG DEFLECTION CONTROL

[75] Inventors: Bernhard Hill, Hamburg; Rudiger Pepperl, Pinneberg; Johann Kruger, Quickborn, all of Fed. Rep. of Germany

[73] Assignee: U.S. Philips Corporation, New York, N.Y.

[21] Appl. No.: 775,454

[22] Filed: Mar. 8, 1977

[30] Foreign Application Priority Data

Mar. 19, 1976 [DE] Fed. Rep. of Germany ....... 2611617

[51] Int. Cl.² ............................................ G11B 21/02
[52] U.S. Cl. ..................................... 350/285; 350/6.3; 350/6.5; 360/107
[58] Field of Search ......................... 350/285, 6.3, 6.5; 365/127; 360/86, 106, 107

[56] References Cited

U.S. PATENT DOCUMENTS

3,544,980   12/1970   Applequist et al. .................... 360/98
3,743,794   7/1973    Miller .................................... 360/106

OTHER PUBLICATIONS

Ramsay et al; "Barium Titanate Ceramics for Fine-Movement Control"; J. Sci. Instrum. 1962, vol. 39, pp. 636–637.

Primary Examiner—John K. Corbin
Assistant Examiner—R. A. Rosenberger
Attorney, Agent, or Firm—Frank R. Trifari; Simon L. Cohen

[57] ABSTRACT

A light deflector used for tracking a spiral information track alternately and periodically interrupted by data blocks and guide segments arranged within sectors of a rotating record carrier. The light deflector is controlled during the first turn of the information track by a slow analog light deflector having a small stroke and is controlled during the remainder of the recording by a digital light deflector control device having a relatively large stroke.

8 Claims, 4 Drawing Figures

ELECTRICALLY CONTROLLED ADJUSTING DEVICE FOR A LIGHT BEAM WITH DIGITAL AND ANALOG DEFLECTION CONTROL

The invention relates to an electrically controlled adjusting device for a light beam with digital and analog deflection control for the formation and scanning of spiral data tracks on a rotating storage disk, the spirals being interrupted by guide segments.

Devices of this kind are utilized for the optical storage and retrieval of digital data on a rotating storage disk across which a light beam is passed; the storage layer on the disc can then be physically modified by a light beam modulated with digital and analog deflection control signals corresponding to the data, or the storage layer can modify the light beam; the data is arranged in the form of data blocks on a spiral so that between the data blocks alternately a small guide segment or a blank segment is present; the angle of the arc which consists of a data block and a guide segment and angle of the arc which consists of a data block and a blank segment being equal. The spiral is sub-divided into sectors which contain only data blocks or only guide segments or blank segments, so that the radial distance in each guide segment sector between adjacent guide segments becomes twice the distance between the data blocks in each sector, the spiral being optically addressed by the light beam which is controlled on the spiral via a deflection system so that it essentially follows the spiral.

In order to achieve a high storage density, the pitch and hence the control of the first turn of the spiral on the storage plate or of the first spiral turn of a data block if the storage disk is subdivided into separate radial regions, is decisive, because a track organization stage always determines the distance from the next adjoining spiral turn in relationship with the previous spiral turn, i.e. if the first spiral turn has a rather great pitch as result of coarse control, the entire spiral has a rather great pitch, so that the storage density is substantially reduced.

The invention has for its object to provide an adjusting device for the described optical method, by means of which an extremely high storage density is achieved and by means of which the pitch of the first turn of the data spiral, which should be in the range of from 1 to 2 microns, can be very accurately maintained.

This object is achieved in that a slow analog light deflector is controlled by an adjusting member having a small stroke during the first turn of the data spiral, while during the other turns of the spiral it is controlled by an adjusting member which is coupled to the first adjusting member and which has a large stroke.

Even in the case of a very large number of spiral turns, only the first spiral turn must be suitably controlled in order to obtain maximum density and precision of the further spiral turns.

It is particularly advantageous to use an objective which is displaceable in the radial direction across the storage disk and which receives the light rays for the slow analog light deflector. Furtheremore, a piezoelectrically controlled adjusting member can be used as the adjusting member with the small stroke to enable high-precision control.

Embodiments in accordance with the invention are shown in the drawing.

Figure 2:
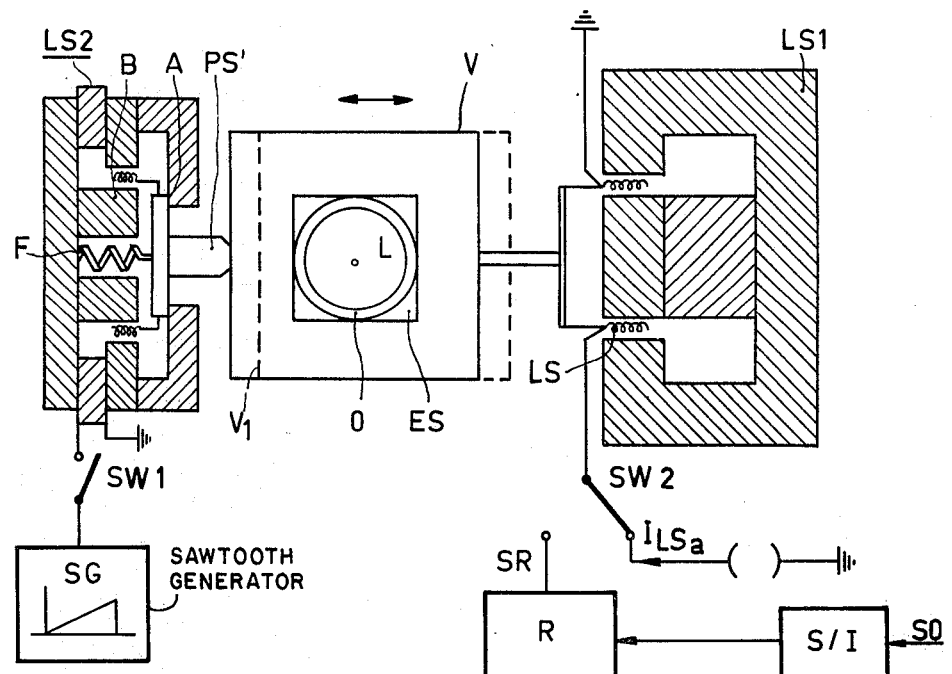
Figure 3:
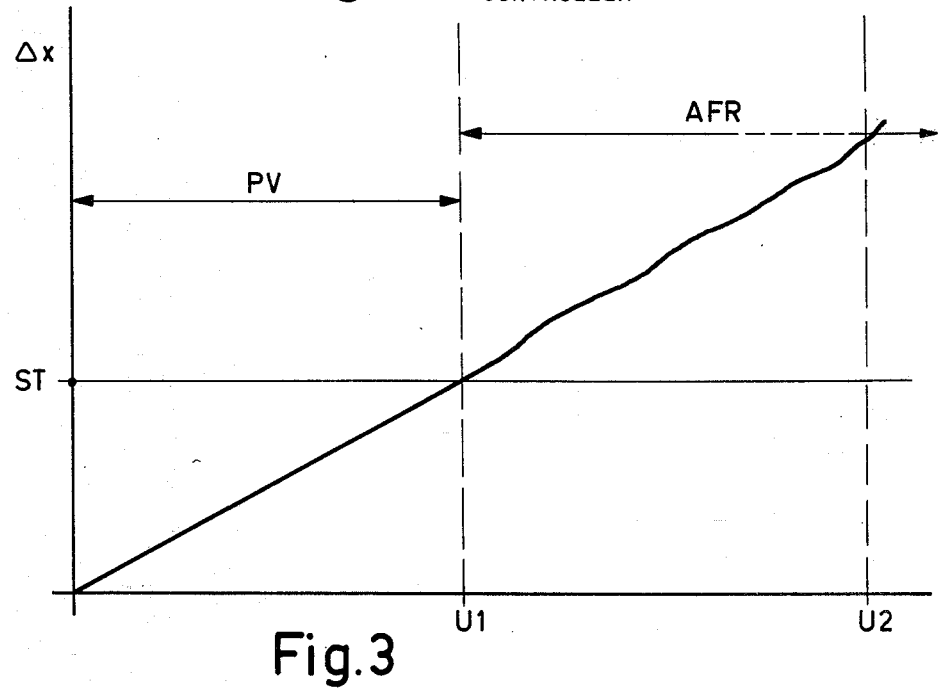
Figure 4:
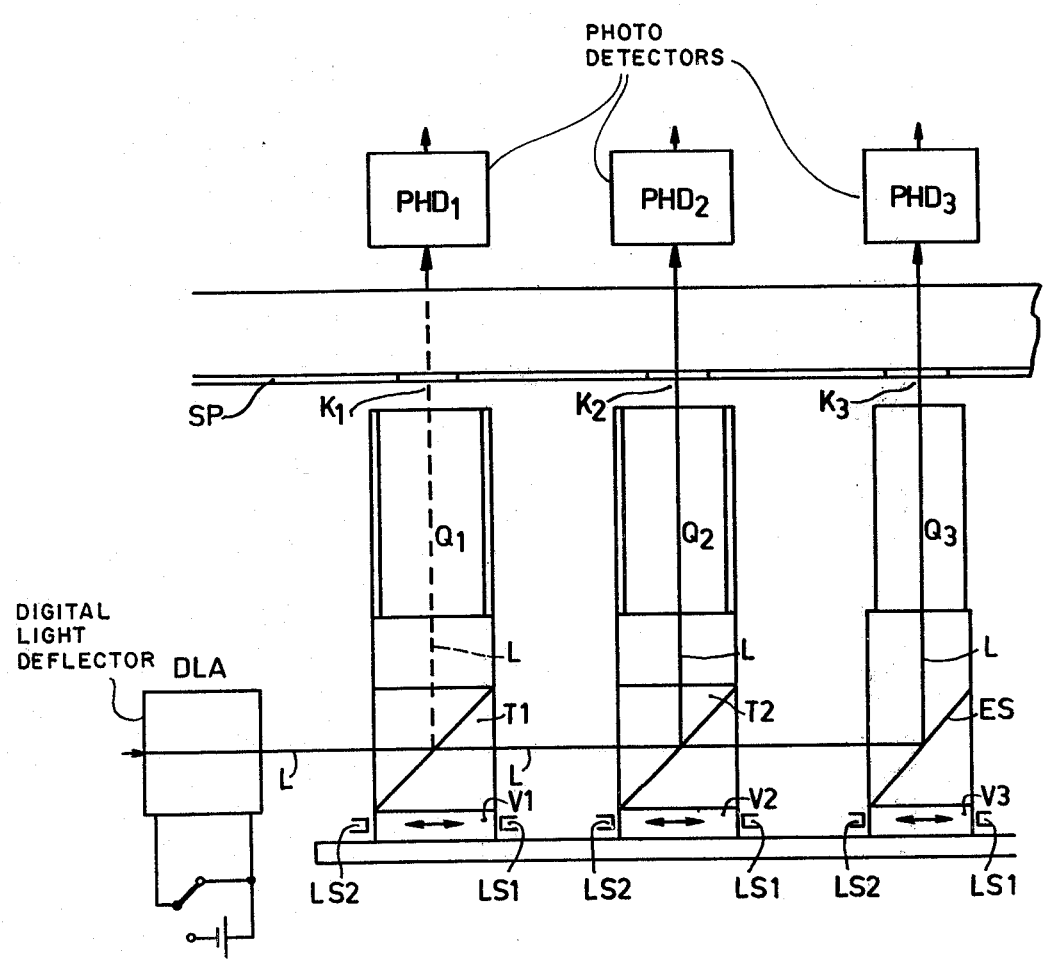

FIG. 1 illustrates a storage disk with track lay-out according to the invention, FIG. 2 is a diagrammatic longitudinal sectional view of an adjusting device, together with its control device, FIG. 3 illustrates the starting phase, and FIG. 4 is a diagrammatic plan view of a multiple arrangement of light deflectors.

FIG. 1 shows the storage disk SP on a rotating turntable. The digital data are arranged in data blocks $D_1$ . . . in a spiral $D_S$ on the storage disk. Between the data blocks along the spiral there is alternately provided a blank segment SG and a guide segment FSG. The guide segment FSG may be a unmodulated track. The blank segment SG and the guide segment FSG have the same length in angular degrees. The following periodic arrangement occurs on the spiral: . . . —data block $D_1$ — guide segment FSG — data block $D_2$ — blank segment SG — data block $D_3$ —guide segment FSG . . . The storage disk is subdivided as shown into the sectors $S_1$, $S_2$ $S_N$. In the sub-sectors $FS_1$, $FS_2 FS_N$, the guide segments FSG and the blank segment SG are arranged in an alternating sequence, viewed in the radial direction of the disk in a sub-sector FS. The radial distance between the adjacent guide segments FSG is twice the distance between the turns of the data spiral $D_S$.

The spiral starts with a turn which consists only of guide segments FSG' and which is subdivided so that it is adapted to the described periodicity.

The tracks to be written, i.e. guide segments and data, are written or read by means of an optical system consisting of a light source, a fast digit light deflector which enables an abrupt change-over of the light beam from one spiral turn to the neighboring turn, and a slow analog light deflector by means of which the same light beam or the same deflected light beams are guided along the spiral.

In FIG. 2, the slow light deflection system for the first spiral turn, for example, of a radial region on the storage disk, consists of an objective O which can be displaced in the radial direction and a flat mirror ES which takes up the light beam of the fast light deflector and which is rigidly connected to a sliding table V. The sliding of the objective O across the total radial storage region is effected by a moving coil system $LS_1$. The sliding for obtaining the pitch of the first turn of the spiral is realized by means of a piezo-electric adjusting member of a moving coil system $LS_2$. Piezo-electric adjusting members are known per se, for example, from Journal of Scientific Instruments, volume 39, pages 636/637, 1962, J. V. Ramsay and E. G. V. Mugridge. Adjusting members of this kind produce, for example, linear shifts of 1 micron at a voltage of 100 V.

The operation of the device is as follows. When the writing of the spiral is started on a blank storage disk, the carrier plate of the sliding table V is pressed against the abutment A with the spring-loaded (F) piezo-electric adjusting member PS' by the moving coil system $LS_2$. At the same time, the sliding table V is pressed against PS' by the moving coil system $LS_1$. This is realized in that via the switch $SW_2$ a suitable adjusting current is applied to the coil LS. A play-free coupling is obtained between the piezo-electric adjusting member PS' and the sliding table V, and the focus of the light beam produced by the objective O and reflected by the flat mirror ES is positioned on the storage surface in a starting position which is defined relative to the radial coordinate. The current of the coil LS of the moving coil system $LS_1$ is adjusted so that the piezo-electric adjusting member PS' can overcome the counter-force.

During a revolution of the storage disk, the sliding table V is shifted by the piezo-electric adjusting member over a distance which corresponds to the pitch of the first turn of the data spiral by the writing of guide segments on the storage disk. To this end, the piezo-electric adjusting member is connected, via the switch $SW_1$, to a sawtooth generator which supplies the corresponding voltage within a revolution of the disk.

After this revolution, the further movement of the sliding table V is effected by the moving coil system LS1. To this end, the switch $SW_2$ is switched to the output of the radial control system and the piezo-electric member is at the same time disconnected from the sawtooth generator. This control circuit operates as a servo system in which a measuring signal SO is derived by the optical scanning of the already written track by means of the fast light deflector, the said measuring signal giving information as regards the instantaneous distance of the writing beam from the already written track. A measuring system of this kind is elaborated in U.S. Patent Application Serial No. 686,254, filed May 13, 1976.

The measuring signal is compared with a reference signal in a comparison device S/I, and therefrom a control signal SR is derived in the controller R for adjusting the sliding table V by way of the moving coil system $LS_1$.

The completion of the said starting phase is graphically shown in FIG. 3. Therein, $\Delta x$ is a measure for the shifting of the table V; U1 and U2 denote the complete turns 1 and 2, respectively; PV corresponds to the piezo-electric displacement; AFR relates to the automatic guiding via the control system; ST represents the pitch in $\Delta x$ for one turn.

During the read operation, the first turn of the spiral must be located. In order to ensure sufficient play for intercepting the start of the spiral, the moving coil system $LS_2$ is switched off. The piezo-electric adjusting member PS' and the carrier plate $V_1$ are then withdrawn against the abutment B by the spring F.

If a plurality of radial regions $K_1$, $K_2$, $K_3$ on the storage disk SP are to be separately handled, a plurality of slow light deflectors may be adjacently arranged as shown in FIG. 4. Each of the objectives $O_1$, $O_2$ has associated with it a beam splitter $T_1$, $T_2$ which splits the light beam L supplied by the digital light deflector DLA. The last objective $O_3$, however, is associated only with a flat mirror ES. In this transmission process the photodetectors $PHD_1$, $PHD_2$, $PHD_3$, the signals of which are used inter alia to control the track organization stage described in the prior U.S. Pat. application, are arranged behind the storage disk SP.

One of the described adjusting devices $LS_1$, $LS_2$ is provided for each sliding table $V_1$, $V_2$, $V_3$.

When the slow light deflector consists of a flat mirror, a pivotal movement about a pivot instead of the lateral slide is possible. As a result, wider radial regions on the storage disk or the complete region of a storage disk can be covered, if desired. It is then advisable to arrange an objective or a collector lens stationarily in front of the mirror which takes up the light beam.

What is claimed is:

1. A controlled device for positioning a light beam with digital and analog deflection control to track data spiral segments and intervening guide segments on a rotating disk, comprising a light deflector, a slow analog light deflector control means for actuating said light deflector with a small stroke during the first turn of the data spiral, a digital light deflector control means for actuating said light deflector with a relatively large stroke during the other turns of the spiral, said digital light deflector control means being coupled to the analog light deflector.

2. A device as claimed in claim 1, wherein the coupling between the analog control means having the small stroke and the light deflector comprises means in said digital light deflector control means for pressing the light deflector against the analog light deflection control means.

3. A device as claimed in claim 1, wherein the light deflector is an objective which is slidable in the radial direction across the storage disk and which takes up the light beam.

4. An adjusting device as claimed in claim 1 or any of the subsequent claims, characterized in that, wherein tro-dynamically controlled mirror.

5. An adjusting device as claimed in claim 1, wherein the analog light deflector control means having the small stroke is a piezo-electrically controlled adjusting member.

6. An adjusting device as claimed in claim 1, wherein the digital light deflector control means having the large stroke is an electrodynamically controlled adjusting member.

7. An adjusting device as claimed in claim 1, wherein moving coil systems are used as the digital and analog control means.

8. An adjusting device as claimed in claim 1, further comprising means for scanning guide segments of the previous turn of the spiral and for providing photo-electric signals corresponding to tracking errors, wherein said photo-electric signals are connected as control signals to said digital light deflector control means.

* * * * *

UNITED STATES PATENT AND TRADEMARK OFFICE
CERTIFICATE OF CORRECTION

PATENT NO. : 4,123,147
DATED : October 31, 1978
INVENTOR(S) : Bernhard Hill, Rudiger Pepperl and Johann Kruger It is certified that error appears in the above—identified patent and that said Letters Patent is hereby corrected as shown below:

Claim 4, lines 32-33, delete "or any of the subsequent claims, characterized in that," and add, after wherein,--the light deflector is a piezo-electrically and elec--

Signed and Sealed this

Seventh Day of September 1982

[SEAL]

Attest:

GERALD J. MOSSINGHOFF

*Attesting Officer*  *Commissioner of Patents and Trademarks*